US008996465B2

(12) United States Patent  
Mielenhausen (10) Patent No.: US 8,996,465 B2
(45) Date of Patent: Mar. 31, 2015

(54) REPLICATING DATA TO A DATABASE (75) Inventor: Bjoern Mielenhausen, Plankstadt (DE)

(73) Assignee: SAP AG, Walldorf (DE)

( * ) Notice: Subject to any disclaimer, the term of this patent is extended or adjusted under 35 U.S.C. 154(b) by 527 days.

(21) Appl. No.: 13/415,433

(22) Filed: Mar. 8, 2012

(65) Prior Publication Data

US 2013/0238556 A1 Sep. 12, 2013

(51) Int. Cl.
G06F 7/00 (2006.01)
G06F 17/30 (2006.01)

(52) U.S. Cl.
USPC ............ 707/639; 707/637; 707/634; 707/611

(58) Field of Classification Search
None
See application file for complete search history.

(56) References Cited

U.S. PATENT DOCUMENTS

| | | | | |
|---|---|---|---|---|
| 5,452,445 | A * | 9/1995 | Hallmark et al. ...................... | 1/1 |
| 5,603,024 | A * | 2/1997 | Goldring ....................... | 707/615 |
| 5,870,758 | A * | 2/1999 | Bamford et al. ...................... | 1/1 |
| 7,328,316 | B2 * | 2/2008 | Moir et al. .................... | 711/150 |
| 7,546,598 | B2 | 6/2009 | Blumenthal et al. | |
| 7,890,455 | B2 * | 2/2011 | Bourbonnais et al. ........ | 707/609 |
| 7,962,458 | B2 * | 6/2011 | Holenstein et al. ........... | 707/704 |
| 7,974,943 | B2 * | 7/2011 | Gilbert et al. ................. | 707/610 |
| 8,326,889 | B2 * | 12/2012 | Kaisermayr .................. | 707/803 |
| 8,504,542 | B2 * | 8/2013 | Chang et al. .................. | 707/704 |
| 2003/0055805 | A1 * | 3/2003 | Gardner ........................... | 707/1 |
| 2006/0218206 | A1 * | 9/2006 | Bourbonnais et al. ........ | 707/202 |
| 2008/0222159 | A1 * | 9/2008 | Aranha et al. .................. | 707/10 |
| 2009/0313311 | A1 * | 12/2009 | Hoffmann et al. ............ | 707/204 |
| 2012/0089566 | A1 * | 4/2012 | Effern et al. .................. | 707/611 |
| 2012/0102006 | A1 * | 4/2012 | Larson et al. ................. | 707/703 |
| 2012/0150802 | A1 * | 6/2012 | Popov et al. .................. | 707/635 |
| 2012/0167098 | A1 * | 6/2012 | Lee et al. ...................... | 718/101 |
| 2012/0303581 | A1 * | 11/2012 | Calder et al. .................. | 707/626 |
| 2013/0060742 | A1 * | 3/2013 | Chang et al. .................. | 707/704 |
| 2013/0103659 | A1 * | 4/2013 | Larson et al. ................. | 707/703 |
| 2013/0110767 | A1 * | 5/2013 | Tatemura et al. ............. | 707/607 |
| 2013/0110883 | A1 * | 5/2013 | Junqueira et al. ............. | 707/803 |

OTHER PUBLICATIONS

"Isolation (database systems)," http://en.wikipedia.org/wiki/Isolation_level, last visited on Oct. 13, 2011 (6 pages).

* cited by examiner

Primary Examiner — Hexing Liu
(74) Attorney, Agent, or Firm — Fish & Richardson P.C.

(57) ABSTRACT

Techniques for replicating data to a database include determining a change to at least one database value in a database table on a source repository; updating, based on the change to the at least one database value, a snapshot value associated with the change to the at least one database value stored in a log table; incrementing a commit value associated with the snapshot value stored in a commit table, the commit table comprising a plurality of commit values associated with a plurality of corresponding snapshot values; initiating replication of the database from the source repository to a target repository; determining a maximum commit value of the plurality of commit values; and replicating the database value in the database table from the source repository to the target repository based on the commit value associated with the snapshot value being less than or equal to the maximum commit value.

24 Claims, 8 Drawing Sheets

```
INSERT INTO COMMITTED VALUES <transaction-ID>;
```

FIG. 3A

```
DECLARE GLOBAL_ID AS int;
@GLOBAL_ID = SELECT MAX(COMMIT_ID) FROM COMMITTED WITH SHARED LOCK;
CURSOR CTABLENAME IS SELECT TABLENAME
      FROM CHANGE JOIN COMMITTED ON SNAPSHOT_ID
      WHERE COMMIT_ID <=@GLOBAL_ID;
OPEN TABLENAME;
LOOP
   FETCH CTABLENAME INTO TABLENAME;
   SELECT KEY, VALUE FROM @TABLENAME AS LOG JOIN COMMITTED ON SNAPSHOT_ID
      WHERE COMMIT_ID = SELECT MAX(COMMIT_ID) FROM @TABLENAME AS L
                          WHERE L.KEY = LOG.KEY AND
                                L.COMMIT_ID <= @GLOBAL_ID;
ENDLOOP
```

FIG. 3B

| key | val |
|-----|-----|
| 1 | a |
| 2 | b |
| 3 | c |
| 5 | c |

FIG. 4A

| SNAP_ID | COMMIT_ID |
|---------|-----------|
| 100 | 1001 |
| 200 | 1002 |

FIG. 4C

| key | SNAP_ID | val |
|---|---|---|
| 1 | 100 | a |
| 2 | 200 | b |
| 3 | 300 | c |
| 5 | 100 | a |
| 5 | 200 | b |
| 5 | 300 | c |

FIG. 4B

| key | SNAP_ID | COMMIT_ID | val |
|---|---|---|---|
| 1 | 100 | 1001 | a |
| 2 | 200 | 1002 | b |
| 3 | 300 | 1003 | c |
| 5 | 100 | 1001 | a |
| 5 | 200 | 1002 | b |
| 5 | 300 | 1003 | c |

FIG. 4D

```
DECLARE GLOBAL_ID AS int;
-- determin the current globa ID and keep a shared lock
@GLOBAL_ID = SELECT ID FROM GLOB_ID WHITH SHARED LOCK WITH HOLD;
-- loop over all logs what have been effected by the transaction
CURSOR CTABLENAME IS SELECT TABLENAME FROM CHANGE
        WHERE SNAPSHOT_ID = <TRANSACTION-ID>;
OPEN TABLENAME;
LOOP
    FETCH CTABLENAME INTO TABLENAME;
        -- merge local changes into current global image
        INSERT INTO @TABLENAME(SNAPSHOT_ID, KEY, VAL) AS
            SELECT SNAPSHOT_ID, KEY, VAL FROM @TABLENAME AS L
                WHERE SNAPSHOT_ID = <TRANSACTION-ID>
            ON DUPLICATE KEY UPDATE SET VAL = L.VAL;
        DELETE FROM @TABLENAME WHERE LOG.SNAPSHOT_ID = <TRANSACTION-ID>;
END LOOP;
-- transfer change information to global image
INSERT CHANGE ( TABNAME, SNAPSHOT_ID )
    SELECT TABNAME, SNAPSHOT_ID WHERE SNAPSHOT_ID = <TRANSACTION-ID>;
DELETE CHANGE WHERE SNAPSHOT_ID = <TRANSACTION-ID>;
```

FIG. 5A

```
DECLARE GLOBAL_ID AS int;
-- increase global id and commit changes before starting replication
@GLOBAL_ID = SELECT SNAPSHOT_ID FROM GLOB_ID;
UPDATE GLOB_ID SET SNAPSHOT_ID = @GLOBAL_ID + 1;
COMMIT WORK;
CURSOR CTABLENAME IS SELECT TABLENAME
        FROM CHANGE WHERE SNAPSHOT_ID = @GLOBAL_ID;
OPEN TABLENAME;
FETCH CTABLENAME INTO TABLENAME;
LOOP
        SELECT KEY, VALUE FROM @TABLENAME AS LOG
            WHERE COMMIT_ID = @GLOBAL_ID;
ENDLOOP
```

| key | val |
|---|---|
| 1 | a |
| 2 | b |
| 3 | c |
| 5 | c |

FIG. 6D

| key | SNAP_ID | val |
|---|---|---|
| 1 | 1 | a |
| 2 | 1 | b |
| 3 | 2 | c |
| 5 | 1 | b |
| 5 | 2 | c |

FIG. 6E

| SNAP_ID |
|---|
| 2 |

FIG. 6F

REPLICATING DATA TO A DATABASE

TECHNICAL BACKGROUND

This disclosure relates to replicating data between two or more databases and, more particularly, replicating data from a source database to a target database.

BACKGROUND

Data replication describes the process of synchronizing the content of a primary source database and a secondary target database. Asynchronous data replication usually focuses on maximizing throughput. As a consequence, consistency of the data replication may be compromised. For example, if changes are applied in parallel using multiple transactions, there is danger that a portion of changes to the content one or more database tables applied by one transaction might be visible because they might already have been committed while another portion of changes is still pending. These inconsistencies may be resolved once all changes are committed to the target database. For example, the target system may become consistent if it is halted for a sufficient time, which decreases throughput.

Simple algorithms that reread the data from the original tables upon transportation have at least to rely on shared locks in order to avoid dirty reads. However, this may lead to waiting situations where throughput is decreased. For example, assuming that a data replicator tries to acquire read locks on certain data in a database table, if the data on which locks are to be acquired is already occupied by an exclusive lock held by a particular transaction, the replicator may be delayed. During that time, the data replicator may block multiple transactions acquiring exclusive locks on the entries already locked. Therefore, throughput on the source system may get significantly impacted. This may lead to deadlocks and hence can lead to aborting transactions.

SUMMARY

This disclosure relates to replicating data between two or more databases and, more particularly, replicating data from a source database to a target database while, in some embodiments, maximizing throughput and consistency and minimizing isolation level during replication. For example, data may be replicated from a source repository to a target repository by maintaining "snapshots" of the source repository database through log tables that record unique identifiers when data in the database is changed. Such unique identifiers may then be associated with secondary identifiers that indicate when data in the source repository has been committed. Data in the source repository that is committed prior to the last committed data prior to replication may then be replicated, thus ensuring (at least partially) consistency between the source and target repositories.

Techniques for replicating data to a database include a general embodiment of apparatus, systems and methods including determining a change to at least one database value in a database table of a database on a source repository; updating, based on the change to the at least one database value, a snapshot value associated with the change to at least one database value stored in a log table, the log table comprising the database value, a database key associated with the database value, and the snapshot value associated with the change to the at least one database value; incrementing, based on the update to the snapshot value, a commit value associated with the snapshot value stored in a commit table, the commit table comprising a plurality of commit values associated with a plurality of corresponding snapshot values; initiating replication of the database from the source repository to a target repository; determining, subsequent to initiating replication, a maximum commit value of the plurality of commit values; and replicating the database value in the database table from the source repository to the target repository based on the commit value associated with the snapshot value being less than or equal to the maximum commit value.

A first aspect combinable with any of the general embodiments includes acquiring a lock on the database table during replication of the database value in the database table from the source repository to a target repository.

A second aspect combinable with any of the previous aspects includes substantially preventing changes to the at least one database value in the database table during lock.

A third aspect combinable with any of the previous aspects includes applying the replicated database value in the database table in the target repository to a corresponding database value in a corresponding database table in the target repository so that the corresponding database value matches the replicated database value.

A fourth aspect combinable with any of the previous aspects includes determining a change to a second database value in the database table.

A fifth aspect combinable with any of the previous aspects includes updating, based on the change to the second database value, a second snapshot value associated with the change to the second database value stored in the log table.

A sixth aspect combinable with any of the previous aspects includes incrementing, based on the update to the second snapshot value, a second commit value associated with the second snapshot value stored in the commit table.

A seventh aspect combinable with any of the previous aspects includes replicating the second database value from the source repository to the target repository based on the second commit value associated with the second snapshot value being less than or equal to the maximum commit value.

In an eighth aspect combinable with any of the previous aspects, replicating the second database value in the database table from the source repository to the target repository occurs substantially in parallel with applying the replicated database value in the database table in the target repository to the corresponding database value in a corresponding database table in the target repository.

In a ninth aspect combinable with any of the previous aspects, replicating the database value in the database table from the source repository to the target repository includes replicating the database value in the database table from the source repository to the target repository at a read uncommitted transaction isolation level.

A tenth aspect combinable with any of the previous aspects includes generating the log table comprising the database value, the database key associated with the database value, and the snapshot value associated with the change to the at least one database value.

In an eleventh aspect combinable with any of the previous aspects, the log table further includes an operation value associated with the change to the at least one database value.

A twelfth aspect combinable with any of the previous aspects includes generating the commit table comprising the plurality of commit values associated with the plurality of corresponding snapshot values.

In a thirteenth aspect combinable with any of the previous aspects, the commit table is associated with a plurality of log tables.

A fourteenth aspect combinable with any of the previous aspects includes updating, based on the updated snapshot value, a change table including a plurality of snapshot values and a plurality of database table names.

In a fifteenth aspect combinable with any of the previous aspects, each of the plurality of snapshot values associated with a corresponding database table name.

In a sixteenth aspect combinable with any of the previous aspects, updating a change table comprises increasing a snapshot value of the plurality of snapshot values.

Various embodiments of a replication module in accordance with the present disclosure may include one, some, or all of the following features. For example, a replication module may maximize consistent reads of data being replicated from a source database to a target database while minimizing dirty reads, phantom reads, and non-repeatable reads during replication. As another example, the replication module may maximize throughput during replication from a source database to a target database while still maintaining a high level of isolation during replication to minimize inconsistencies. As another example, the replication module may not require a committed read on the source database as compared to conventional replication techniques. As another example, the replication module may replicate data from a source database to a target database in a mostly lock-free transaction (e.g., may not wait for regular transactions on the source database). As yet another example, the replication module may respect transactional consistency if a target database to which data is being replicated is operating in a committed read mode. As yet another example, the replication module may replicate data from a source database to a target database in parallel transactions, thereby increasing throughput and efficiency.

These general and specific aspects can be implemented using a device, system or method, or any combinations of devices, systems, or methods. The details of one or more implementations are set forth in the accompanying drawings and the description below. Other features, objects, and advantages will be apparent from the description and drawings, and from the claims.

DETAILED DESCRIPTION

Figure 1:
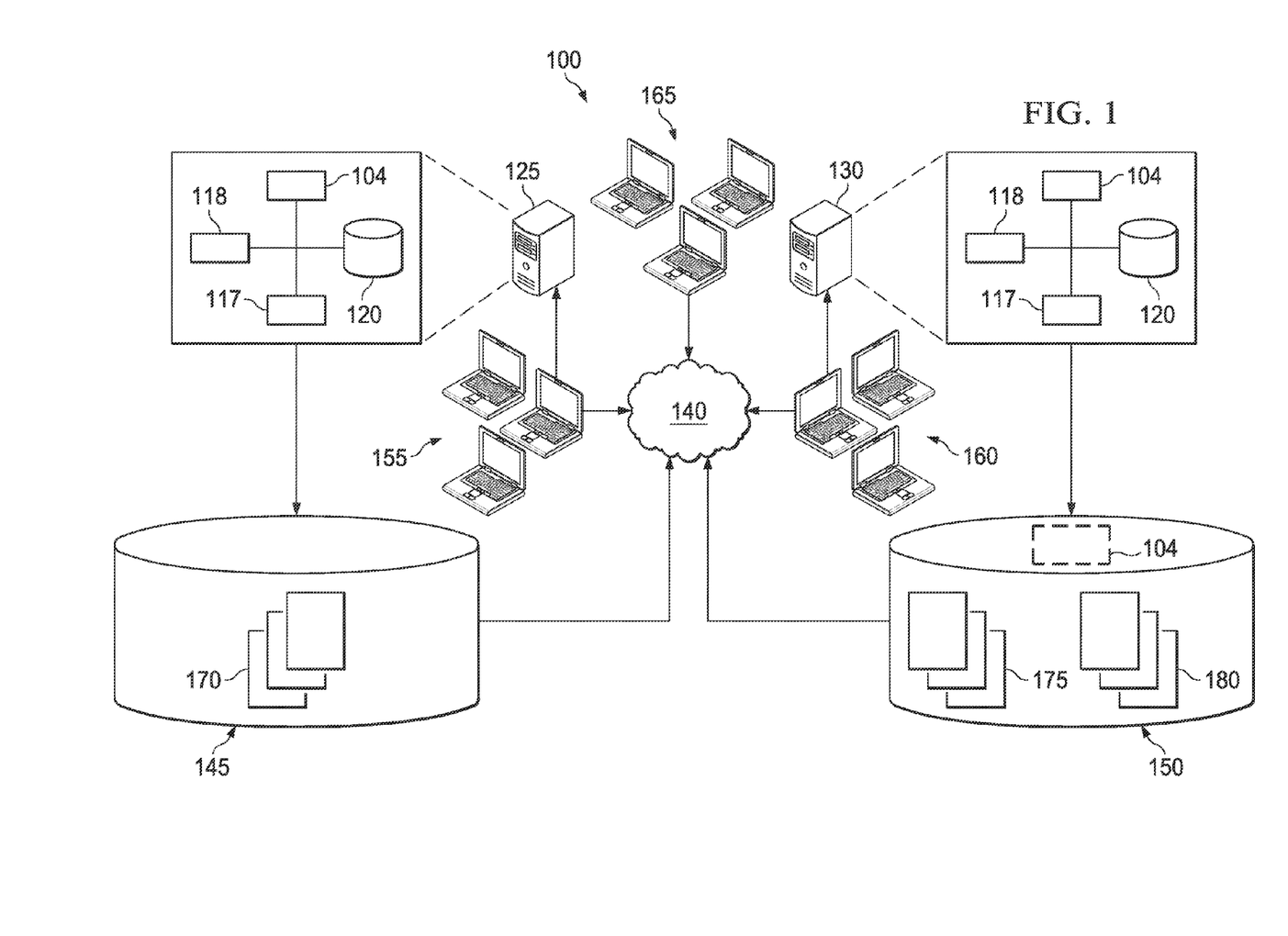
FIG. 1 illustrates an example system including a replication module for replicating data from a source database to a target database according to the present disclosure.

FIG. 1 illustrates an example distributed computing system 100 including a replication module 104 for replicating data from a source database 145 to a target database 150. As illustrated, the system 100 includes a source server 125, a target server 130, the source database 145, and the target database 150, along with one or more groups of client devices (155, 160, and 165) communicably coupled through a network 140. In alternative embodiments, however, one or more of these components may not be part of the distributed computing system 100 without departing from the scope of the present disclosure. For instance, in some embodiments, the target server 130 may not be included in the system 100, and logic (e.g., software, middleware, source code, executable instructions, data, and otherwise) illustrated as residing on the target server 130 may be located on, for example, the target database 150. For example, as illustrated, the replication module 104 may, in some embodiments, reside on the target database 104. Further, in some embodiments, all or a portion of the replication module 104 (described more fully below) may reside on the source server 125. In any event, the illustrated system 100 may have alternative embodiments where various components (e.g., servers, databases, software modules, and otherwise) are not present or reside in or on different appliances than shown in FIG. 1.

Each of the source server 125 and target server 130 include a processor 118, memory 120, and an interface 117. Further as illustrated, each of the source server 125 and the target server 130 may include all or portions of the replication module 104. The replication module 104 may, in some embodiments, include an application operable to perform one or more processes to replicate data stored in database tables 170 on the source database 145 to the target database 150 as corresponding database tables 180.

In general, the source server 125 and target server 130 may each be any server that stores, for example, the replication module 104 and any additional hosted applications, where at least a portion of the replication module 104 is executed via requests and responses sent to users or clients within and communicably coupled to the illustrated system 100. In some instances, the source server 125 and target server 130 may each store a plurality of various hosted applications, while in other instances, the source server 125 and target server 130 may each be a dedicated server meant to store and execute only a single application, such as the replication module 104. In some instances, the source server 125 and target server 130 may each comprise a web server, where the replication module 104 and any other hosted applications represent one or more web-based applications accessed and executed via network 140 by the clients 155, 160, 165, or other clients of the system to perform the programmed tasks or operations of the replication module 104.

At a high level, the source server 125 and target server 130 each comprises an electronic computing device operable to receive, transmit, process, store, or manage data and information associated with the system 100. For example, the source server 125 and target server 130 may each be responsible for receiving application requests from one or more client applications associated with the clients 155, 160, and/or or 165 of system 100 and responding to the received requests by processing said requests in the replication module 104 and/or other hosted application, and sending the appropriate response back to the requesting client application.

In addition to requests from the clients 155, 160, and/or 165 illustrated in FIG. 1, requests associated with the replication module 104 and/or other hosted applications may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single source server 125 and a single target server 130, system 100 can be implemented using two or more source servers 125 and/or target servers 130, as well as computers other than servers, including a server pool. Indeed, source server 125 and target server 130 may each be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated source server 125 and target server 130 may each be adapted to execute any operating system, including Linux, UNIX, Windows, Mac OS, or any other suitable operating system.

At a high level, the replication module 104 is any application, program, module, process, or other software that may execute, change, delete, generate, or otherwise manage information according to the present disclosure, particularly in response to and in connection with one or more requests received from the illustrated clients 155, 160, and/or 165 and their associated client applications. In certain cases, system 100 may implement a composite replication module 104. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others.

Additionally, the replication module 104 may represent web-based applications accessed and executed by remote clients or client applications via the network 140 (e.g., through the Internet). Further, while illustrated as internal to the source server 125 and/or the target server 130, one or more processes associated with the replication module 104 may be stored, referenced, or executed remotely. For example, a portion of a particular replication module 104 may be a web service associated with the application that is remotely called, while another portion of the replication module 104 may be an interface object or agent bundled for processing at a remote client. Moreover, any or all of the replication module 104 may be a child or sub-module of another software module or enterprise application (not illustrated) without departing from the scope of this disclosure. Still further, portions of the replication module 104 may be executed by a user working directly at the source server 125 (e.g., at clients 155) or the target server 130 (e.g., at clients 160), as well as remotely at clients 165.

Each interface 117 is used by the source server 125 and target server 130, respectively, for communicating with other systems in a client-server or other distributed environment (including within system 100) connected to the network 140 (e.g., clients 155, 160, and/or 165, as well as other systems communicably coupled to the network 140). Generally, the interface 117 comprises logic encoded in software and/or hardware in a suitable combination and operable to communicate with the network 140. More specifically, the interface 117 may comprise software supporting one or more communication protocols associated with communications such that the network 140 or interface's hardware is operable to communicate physical signals within and outside of the illustrated system 100.

As illustrated in FIG. 1, the source server 125 and the target server 130 each includes a processor 118. Although illustrated as a single processor 118 in FIG. 1, two or more processors may be used according to particular needs, desires, or particular embodiments of system 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of the respective source server 125 or target server 130 and, specifically, the one or more plurality of hosted applications 114. Specifically, the server's processor 118 executes the functionality required to receive and respond to requests from the clients 155, 160, and/or 165 and their respective client applications, as well as the functionality required to perform the other operations of the replication module 104.

Regardless of the particular implementation, "software" may include computer-readable instructions, firmware, wired or programmed hardware, or any combination thereof on a tangible, non-transitory (or in some instance transitory) medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated system 100, processor 118 executes the respective portion (all are a part) of the replication module and any other hosted applications on the source server 125 and the target server 130.

The source server 125 and the target server 130 also include a respective memory 120. Memory 120 may include any memory or database module and may take the form of volatile or non-volatile memory including, without limitation, magnetic media, optical media, random access memory (RAM), read-only memory (ROM), removable media, or any other suitable local or remote memory component. Memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective source server 125 and target server 130. Additionally, memory 120 may include any other appropriate data, such as VPN applications, firmware logs and policies, firewall policies, a security or access log, print or other reporting files, as well as others.

Generally, the network 140 facilitates wireless or wireline communications between the components of the system 100 (i.e., between the source server 125 and target server 130 and the clients 155, 160, and/or 165), as well as with any other local or remote computer, such as additional clients, servers, or other devices communicably coupled to network 140 but not illustrated in FIG. 1. The network 140 is illustrated as a single network in FIG. 1, but may be a continuous or discontinuous network without departing from the scope of this disclosure, so long as at least a portion of the network 140 may facilitate communications between senders and recipients. The network 140 may be all or a portion of an enterprise or secured network, while in another instance at least a portion of the network 140 may represent a connection to the Internet. In some instances, a portion of the network 140 may be a virtual private network (VPN), such as, for example, the connection between the clients 155, 160, and/or 165 and the source server 125 and target server 130. Further, all or a portion of the network 140 can comprise either a wireline or wireless link. Example wireless links may include 802.11a/b/g/n, 802.20, WiMax, and/or any other appropriate wireless link. In other words, the network 140 encompasses any internal or external network, networks, sub-network, or combination thereof operable to facilitate communications between various computing components inside and outside the illustrated system 100.

The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

Each of the illustrated clients 155, 160, and/or 165 may be any computing device operable to connect to or communicate with at least the source server 125 and target server 130 and/or via the network 140 using a wireline or wireless connection. Further, each illustrated client typically includes a processor, an interface, a graphical user interface (GUI), a client application, and a memory. In general, each illustrated client comprises an electronic computer device operable to receive, transmit, process, and store any appropriate data associated with the system 100 of FIG. 1.

There may be any number of clients associated with, or external to, system 100. For example, while illustrated system 100 includes three sets of clients (155, 160, and 165), alternative implementations of system 100 may include a single client communicably coupled to the source server 125 and target server 130, or any other number suitable to the purposes of the system 100. Additionally, there may also be one or more additional clients external to the illustrated portion of system 100 that are capable of interacting with the system 100 via the network 140. Further, the term "client" and "user" may be used interchangeably as appropriate without departing from the scope of this disclosure. Moreover, while each client 135 is described in terms of being used by a single user, this disclosure contemplates that many users may use one computer, or that one user may use multiple computers.

As used in this disclosure, "client" is intended to encompass a personal computer, touch screen terminal, workstation, network computer, kiosk, wireless data port, smart phone, personal data assistant (PDA), one or more processors within these or other devices, or any other suitable processing device. For example, each client may comprise a computer that includes an input device, such as a keypad, touch screen, mouse, or other device that can accept user information, and an output device that conveys information associated with the operation of the source server 125 and the target server 130 (and replication module 104) or the client itself, including digital data, visual information, the client application, or the GUI.

Both the input and output device may include fixed or removable storage media such as a magnetic storage media, CD-ROM, or other suitable media to both receive input from and provide output to users of the clients through the display, namely, the GUI.

A GUI typically comprises a graphical user interface operable to interface with at least a portion of system 100 for any suitable purpose, including generating a visual representation of client application (in some instances, the client's web browser) and the interactions with the replication module 104, including the responses received from the replication module 104 received in response to the requests sent by a client application. Generally, through the GUI, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, a GUI can represent any graphical user interface, including but not limited to, a web browser, touch screen, or command line interface (CLI) that processes information in system 100 and efficiently presents the information results to the user.

In general, a GUI may include a plurality of user interface (UI) elements, some or all associated with a client application or the replication module 104, such as interactive fields, pull-down lists, and buttons operable by the user at a particular client. These and other UI elements may be related to or represent the functions of the client application, as well as other software applications executable from a particular illustrated client. In particular, a GUI may be used to present the client-based perspective of the replication module 104, and may be used (as a web browser or using a client application as a web browser) to view and navigate the replication module 104, as well as various web pages located both internal and external to the server, some of which may be associated with the replication module 104. For purposes of the present location, a GUI may be a part of or the entirety of a client application, while also merely a tool for displaying the visual representation of application actions and interactions.

As illustrated in FIG. 1, each of the source database 145 and the target database 150 may be communicably coupled to other components in the system 100 (e.g., the source server 125 and the target server 130) via the network 140. As illustrated, the source database 145 may store one or more database tables 170. At a high level, the system 100, through the replication module 104, may replicate the database tables 170 from the source database 145 to the target database 150 by transferring the database tables 170 to the target database 150 as database tables 175 and then applying the database tables 175 in the target database 150 as database tables 170.

Figure 7:
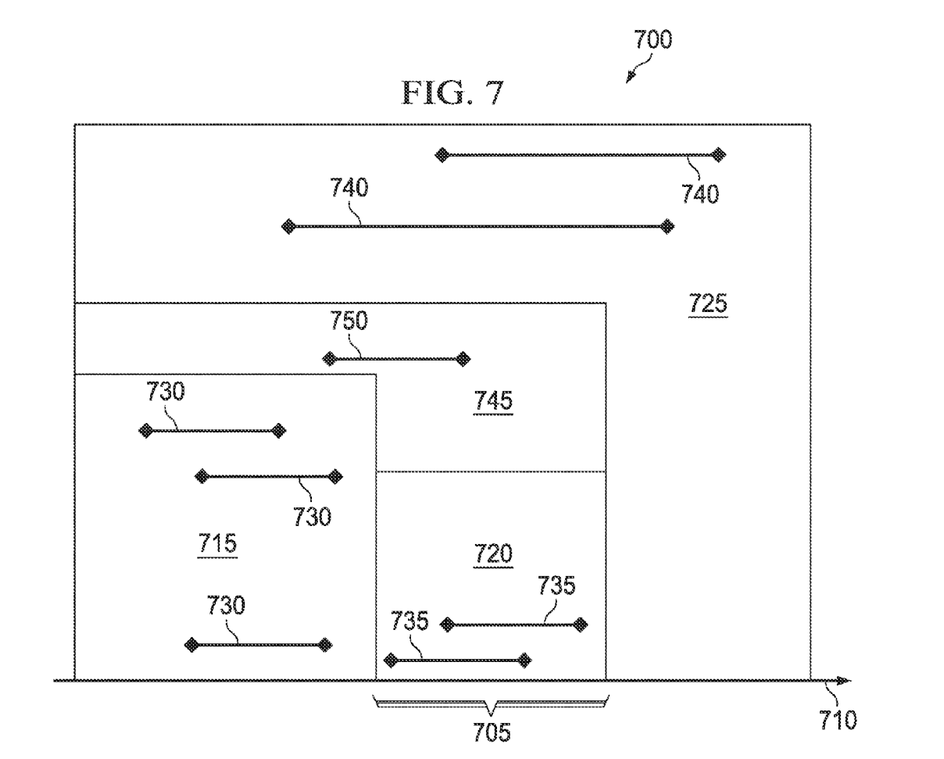
FIG. 7 graphically illustrates different consistency levels of one or more transactions occurring during replication of data from a source database to a target database according to the present disclosure.

Turning briefly to FIG. 7, this figure illustrates a graph 700 that shows different consistency levels of one or more transactions occurring during replication of data, such as database tables 170, from the source database 145 to the target database 150. For example, assume a start(t) that denotes a start time of a transaction T and a commit(T) that denotes a commit time in which the transaction T commits its data to one of the database tables 170 in the source database 145. Further, graph 700 illustrates a $t_{start\_rep}$ and a $t_{end\_rep}$ that, respectively, denote a beginning and an end of a data replication from the source database 145 to the target database 150. The difference between $t_{start\_rep}$ and $t_{end\_rep}$ is time period 705 shown on a time axis 710. In some instances, such as when a replication module cannot rely on an isolation level during replication for all transactions T in which commit(T) is less than or equal to $t_{end\_rep}$, then changes to the data by transaction T may not be applied consistently. For example, transactions T with start (T) less than $t_{start\_rep}$ and commit(T) less than or equal to $t_{end\_rep}$ may cause phantom reads 750 in zone 745 of graph 700. Transactions T with start(T) greater to or equal to $t_{start\_rep}$ and commit(T) less than or equal to $t_{end\_rep}$ may cause non-repeatable reads 735 in zone 720 of graph 700. While inconsistent reads due to phantom reads 750 or non-repeatable reads 735 may be solved during a subsequent replication of data from the source database 145 to the target database 150, this may require a sufficient amount of time in which no transactions occur, which may cause a decrease in throughput efficiency. Transactions T with a commit(T) greater than $t_{end\_rep}$ (regardless of start(t)) may cause dirty reads 740 in zone 725 of graph 700. In such cases, the target database 150 may become inconsistent beyond repair, since uncommitted changes of transactions that may be eventually rolled back (e.g., changed by later transactions) into the source database 145 may be replicated but cannot be rolled back on the target database 150. Transactions with commit(t) less than $t_{start\_rep}$ are consistent reads 730 in zone 715, in which data is replicated correctly from the source database 145 to the target database 150.

In some embodiments, one or both of the source database 145 and the target database 150 may be an in-memory database including integrated processing, i.e., all business and/or analytic operations done in processing memory. Thus, the in-memory database, in some aspects, may handle the analytical systems for all business data in real-time, as opposed to, for instance, computational processing systems that have separate transactional and analytical systems that connect through relational databases (i.e., relational databases stored on magnetic memory that require a process, e.g., ETL, to transfer data from one system to another not in real time but with a delay of an hour, day, week, or longer). In some embodiments, for example, the replication module 104 (all or partially) may be stored and/or executed on the target database 150 (e.g., by one or more processors on or communicably coupled with the target database 150).

The replication module 104, in some embodiments, may include instructions that, when executed, replicate data between the source database 145 to the target database 150 while, in some embodiments, maximizing throughput and consistency and minimizing isolation level during replication. For example, the replication module 104 may generate, maintain, update, or otherwise manage, "snapshots" of the source database 145 through log tables that record unique identifiers when data (e.g., database tables 170) in the database 145 is changed. Such unique identifiers may then be associated with secondary identifiers that indicate when data in the source repository 145 has been committed. Data in the source repository 145 that is committed prior to the last committed data prior to replication may then be replicated, thus ensuring (at least partially) consistency between the source database 145 and target database 150.

Figure 2:
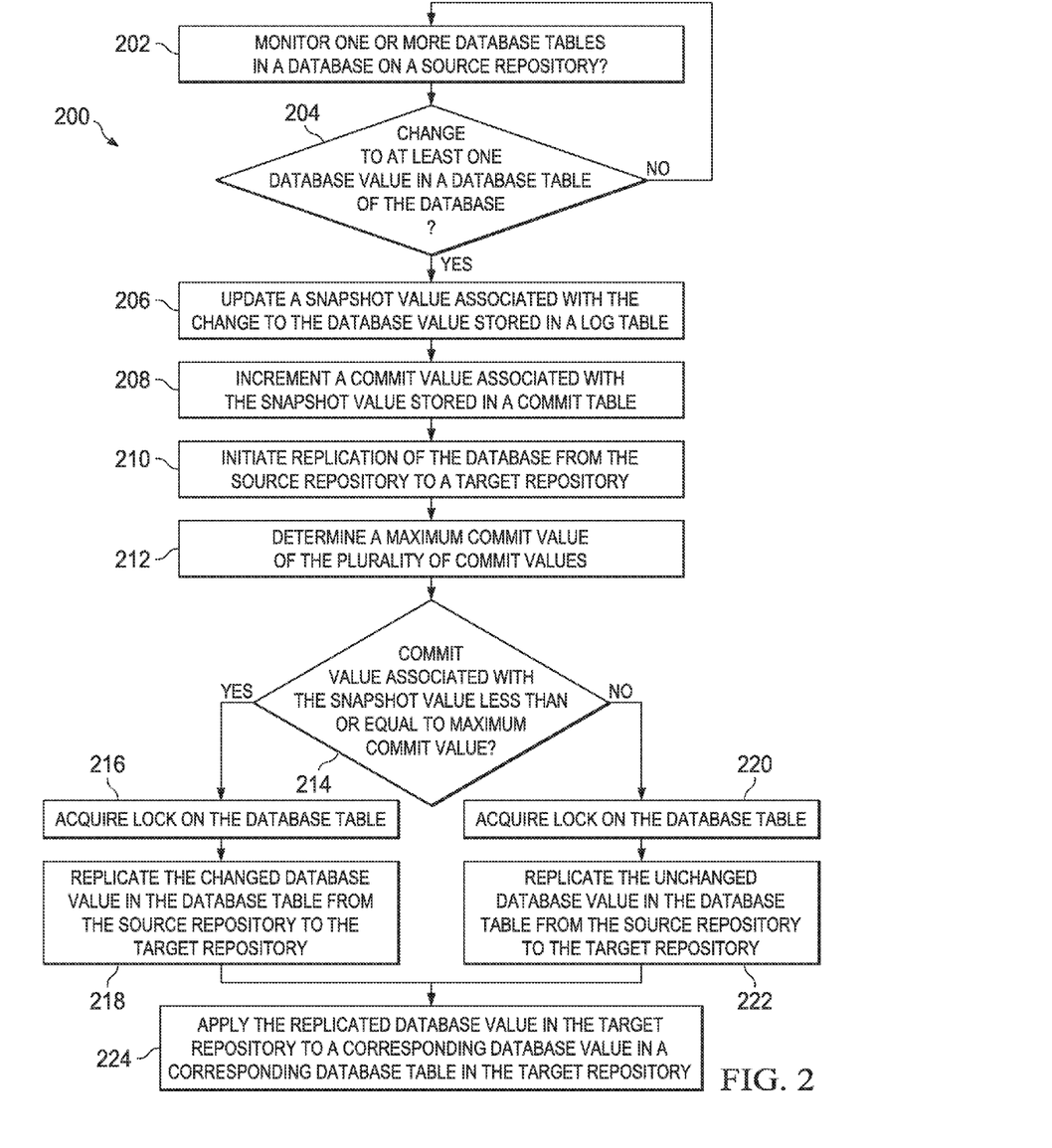
FIG. 2 illustrates an example method for replicating data from a source database to a target database according to the present disclosure.

FIG. 2 illustrates an example method 200 for replicating data from a source database to a target database, such as data in database tables 170 from the source database 145 to the target database 150. In some embodiments, the replication module 104 may execute all or part of the method 200, either on the source server 125, the target server 130, the target database 150, and/or a combination thereof.

Figure 4A:
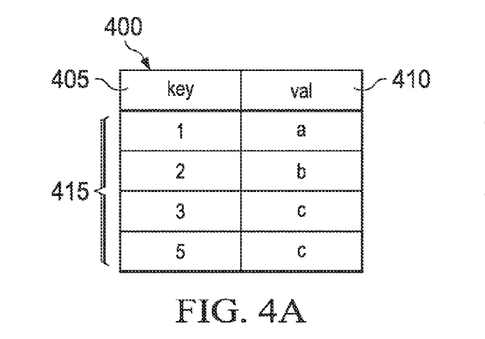
FIGS. 4A-4D illustrate example tables generated by, for example, a replication module during replication data from a source database to a target database according to the present disclosure.

Method 200 may start at step 202, when the replicator module monitors one or more database tables in a database on a source repository. For instance, the monitored database tables may be similar to or identical to the database tables 170 shown on source database 145 in FIG. 1. Further, turning to FIG. 4A, for example, an exemplary database table 400 is shown having a key column 405 and a value column 410. Rows 415 having keys and corresponding values populate the database table 400. In this example, it may be assumed that transaction t[1] has a value "a" at time T100; transaction t[5] has a value "a" at time T100; transaction t[2] has a value "b" at time T200; transaction t[5] has a value "b" at time T200; transaction t[3] has a value "c" at time T300; and transaction t[5] has a value "c" at time T300. Further, in this example, it may be assumed that the transactions at time T100 are committed (e.g., committed prior to replication start time), while the transactions at time T200 are currently committing (e.g., committing between replication start time and replication end time), and the transactions at time T300 have not yet committed (e.g., commitment not started prior to replication end time).

Figure 4B:
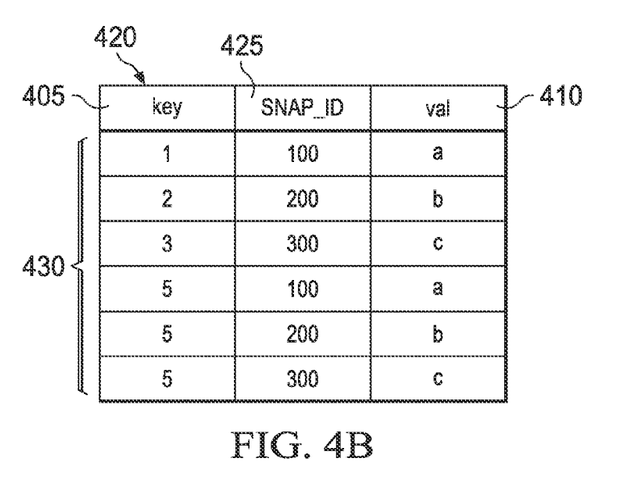

At step 204, the replication module determines whether there is a change to at least one database value in a database table of the database. If no changes are detected, then method 200 may return to step 202. If at least one change is detected, then the replication module updates a snapshot value associated with the change to the database value stored in a log table at step 206. For instance, turning to FIG. 4B, an example LOG table 420 is illustrated, having the key column 405, the value column 410, and a SNAPSHOT ID column 425. The LOG table 420 includes rows 430 populated by keys and associated values along with associated SNAPSHOT IDs. For instance, continuing the previous example, the LOG table 420 shows that changes were made to t[5] at three time instants, which correspond to SNAPSHOT IDs of 100, 200, and 300 for t[5]. Values for t[1], t[2], and t[3] are shown to have values changed or provided at SNAPSHOT IDs of 100, 200, and 300, respectively. In some embodiments, the method may also include the step of generating the log table. In some embodiments, the log table may further include another column in which an operation value (e.g., delete, add, or other operation indicating a change to the database table) associated with the change to the at least one database value may be stored.

Figure 3A:
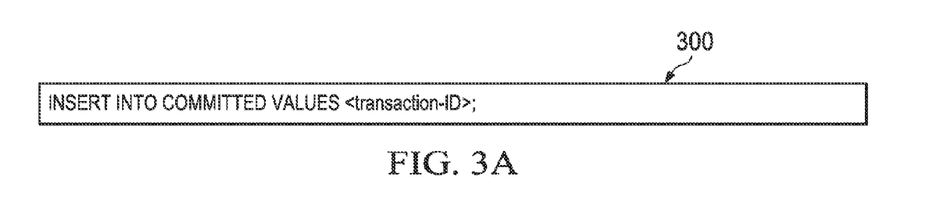
FIGS. 3A-3B illustrate example instructions executed by a system including a replication module for replicating data from a source database to a target database according to the present disclosure.
Figure 4C:
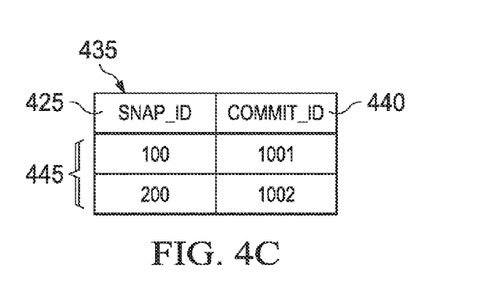

At step 208, the replication module increments a commit value associated with the SNAPSHOT value stored in a commit table. For example, turning to FIG. 4C, a portion of an example COMMITED table 435 is shown having the SNAPSHOT ID column 425 and a COMMIT ID column 440 and rows 445 including associated values for the SNAPSHOT ID column 425 and the COMMIT ID column 440. In some embodiments, method 200 may also include generating the COMMITED table 435. Further, in some embodiments, step 208 may be executed by code 300 shown in FIG. 3A. In alternative embodiments, other portions of code may be executed by the replication module to accomplish step 208.

Figure 4D:
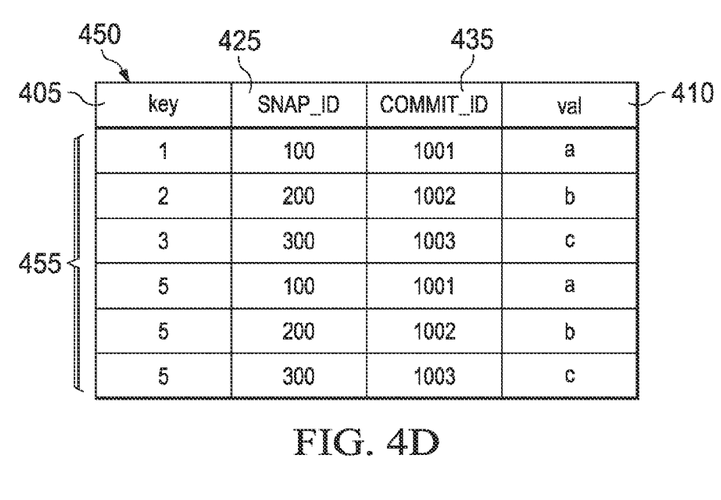

Turning briefly to FIG. 4D, a combination table 450 is illustrated that includes a combination of the LOG table 420 and the COMMITED table 435. As illustrated in the combination table 450, includes the key column 405 and the value column 410 from the LOG table 420. The combination table 450 also includes the SNAPSHOT ID column 425 and the COMMIT ID column 440. Rows 455 associate values from each of the aforementioned columns.

At step 210, the replication module initiates replication of the database from the source repository to a target repository. At step 212, the replication module determines a maximum COMMIT value in the COMMITED table. At step 214, the replication module determines whether a COMMIT value associated with each SNAPSHOT ID value in the COMMITED table is less than or equal to the maximum COMMIT value. In some embodiments, code 350 shown in FIG. 3B may be executed by the replication module to accomplish all or portions of steps 210 through 214. Further, as illustrated in the combination table 450, only transactions having a time T200 or T100 may be replicated, since replication began in this example after T200 but before T300. Thus, only values associated with SNAPSHOT ID less than or equal to a COMMIT ID value associated with T203 may be replicated.

For instance, in some embodiments, the replication module may determine effected database tables by selecting only those database values with a COMMIT ID less than or equal to the highest COMMIT ID at a time in which data replication begins. Thus, if there are multiple entries for a particular key, only the latest value may be selected for replication. In some embodiments, the replication module may acquire a shared lock on the COMMITED table to, for instance, avoid reading transactions in progress during replication. In some embodiments, however, the COMMIT ID value may not represent the exact order of transactions, because concurrent transactions can be committed in arbitrary order after the insertions of respective COMMIT ID values into the COMMITED table. This may be represented by the expression:

$$COMMIT\_ID_{T1} < COMMIT\_ID_{T2} \rightarrow commit(T1) < commit(T2)$$

Assuming that write(T) denotes data that is actually manipulated by a transaction T, the order is correct if transactions write rows in the database table concurrently, i.e., $$COMMIT\_ID_{T1} < COMMIT\_ID_{T2} \wedge commit(T1) > commit(T2) \rightarrow write(T1) \cap write(T2) = \emptyset$$

In some embodiments, the above expressions may be correct because by the time some transaction reaches its commit handler (e.g., code to commit the data), it must already have obtained an exclusive lock on a conflicting row. Thus, it cannot be surpassed by any transaction manipulating the same row.

If a COMMIT value associated with a particular SNAPSHOT ID value in the COMMITED table is less than or equal to the maximum COMMIT value, then the replication module acquires a lock on the database table associated with the SNAPSHOT ID in step 216. For instance, in some embodiments, acquiring the lock may substantially prevent changes to the database value in the database table associated with the SNAPSHOT ID during lock. Next, in step 218, the replication module may replicate the changed database value in the database table associated with the SNAPSHOT ID form the source repository to the target repository. In some embodiments, step 218 may include replicating the database value in the database table from the source repository to the target repository at a read uncommitted transaction isolation level.

Next, at step 224, the replication module may apply the replicated database value in the database table on the target repository to a corresponding database table in the target repository. In some embodiments, steps 218 and 224 may occur substantially simultaneously. For example, in some embodiments, since the source repository may produce high data volume, it may be advantageous to parallelize processing as much as possible. Since the changes in the source database may be applied within one transaction, the process of applying the changes may be divided into two phases. For instance, transfer of LOG tables (e.g., from the source database to the target database) may occur and can be performed in parallel. In some embodiments, parallel tasks may be started on the source repository and transfer of the tables to the target repository may occur through a secondary connection. On the target database, the logs can be applied by executing proper UPSERT and DELETE statements. In some embodiments, since all changes may be committed in one transaction, the target repository support running DML-statements concurrently on multiple processors.

If a COMMIT value associated with a particular SNAPSHOT ID value in the COMMITED table is not less than or equal to the maximum COMMIT value, then the replication module acquires a lock on the database table associated with the SNAPSHOT ID in step 220. Next, in step 222, the replication module may replicate the unchanged database value in the database table associated with the SNAPSHOT ID form the source repository to the target repository. In some embodiments, step 222 may include replicating the database value in the database table from the source repository to the target repository at a read uncommitted transaction isolation level. Next, at step 224, the replication module may apply the replicated database value in the database table on the target repository to a corresponding database table in the target repository.

In some embodiments, method 200 may include additional steps. For example, in some embodiments, a global CHANGE table may be generated and maintained. The global CHANGE table may include two fields, e.g., TABLE name and SNAPSHOT ID. This CHANGE table may be used to track which tables are effectively changed by a certain transaction associated with a particular SNAPSHOT ID value.

Figure 6A:
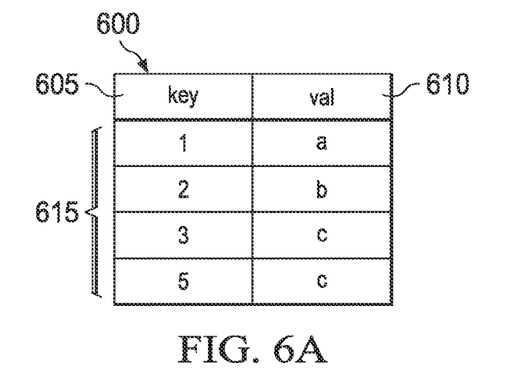
FIGS. 6A-6F illustrate example tables generated by, for example, a replication module during replication data from a source database to a target database according to the present disclosure.

In some embodiments, instead of recording all local transaction "snapshots" and selecting the latest change on some key at the point of the replication as described above with reference to method 200, local "snapshots" (e.g., images) can be merged into a global image at the time the respective transaction commit its changes. For example, in some embodiments, the replication module may, instead of increasing a COMMIT ID when a SNAPSHOT ID is incremented, increase a GLOBAL IMAGE ID before starting any data replication. For this purpose, a GLOBAL ID table, such as the GLOBAL ID table 635 shown in FIG. 6C, may be generated and/or maintained. The GLOBAL ID table 635 may be built by the replication module using, for example, an exemplary database table 600 illustrated in FIG. 6A having a key column 605 and a value column 610. Rows 615 having keys and corresponding values populate the database table 600. The illustrated database table 600 may also use the assumptions provided above. For example, it may be assumed that transaction t[1] has a value "a" at time T100; transaction t[5] has a value "a" at time T100; transaction t[2] has a value "b" at time T200; transaction t[5] has a value "b" at time T200; transaction t[3] has a value "c" at time T300; and transaction t[5] has a value "c" at time T300. Further, as in the above example, it may be assumed that the transactions at time T100 are committed (e.g., committed prior to replication start time), while the transactions at time T200 are currently committing (e.g., committing between replication start time and replication end time), and the transactions at time T300 have not yet committed (e.g., commitment not started prior to replication end time).

Figure 6B:
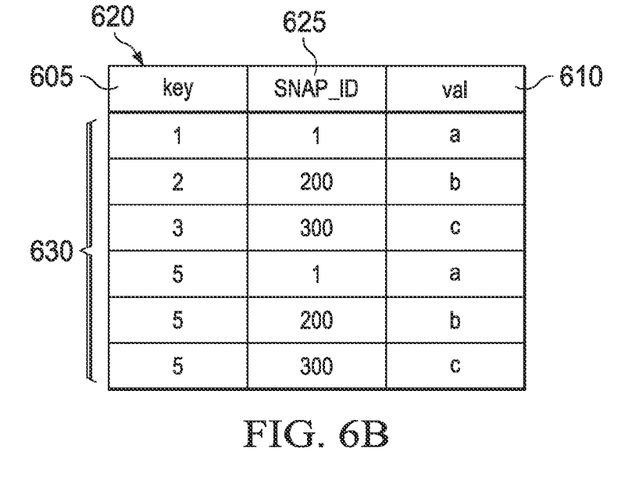

The GLOBAL ID table 635 may also be built by the replication module using an example LOG table 620 illustrated in FIG. 6B. The LOG table 620 includes the key column 605, the value column 610, and a SNAPSHOT ID column 625. The LOG table 620 includes rows 630 populated by keys and associated values along with associated SNAPSHOT IDs.

Figure 6C:
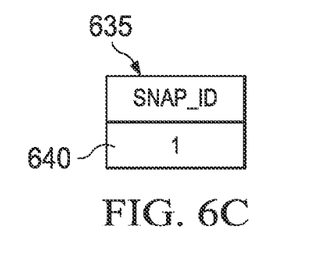
Figure 6D:
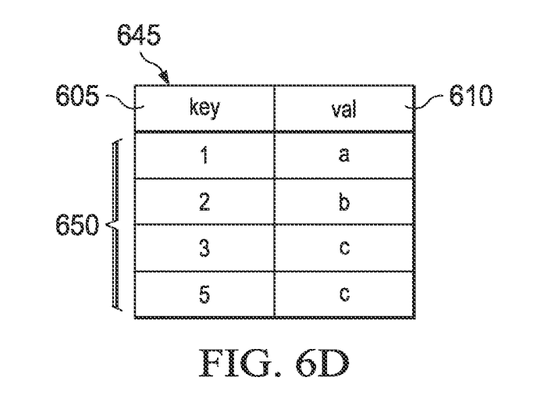
Figure 6E:
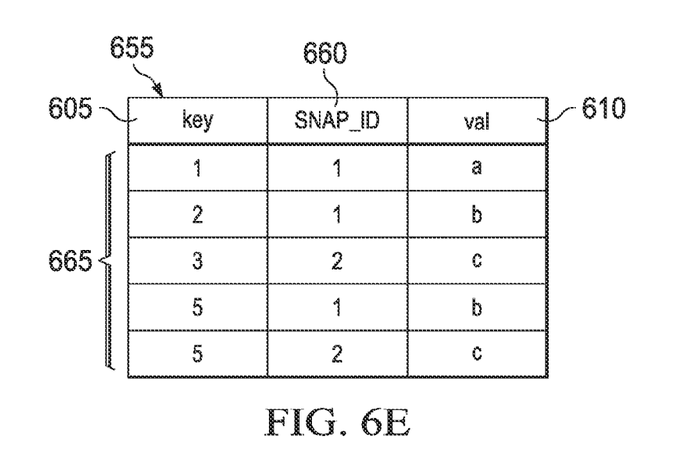
Figure 6F:
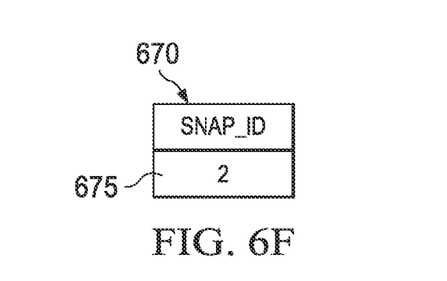

In these alternative embodiments, when committing a transaction, the replication module may inject code (e.g., some SQL-code) by, for example, calling a stored-procedure or using an on-commit-trigger if available. In these alternative embodiments, a CHANGE table may be used to track all database tables that have been changed. In all respective LOG tables, however, the SNAPSHOT ID may be changed to the GLOBAL IMAGE ID (e.g., as shown in FIG. 6C. The corresponding entries in the CHANGE table may also be set to the GLOBAL IMAGE ID. In some aspects of these embodiments, a read lock may be acquired on GLOBAL IMAGE ID in order to prevent initiation of a replication while the private image is merged. In such embodiments, the COMMITTED table (e.g., COMMITTED table 435) may not be required and/or used.

Figure 5A:
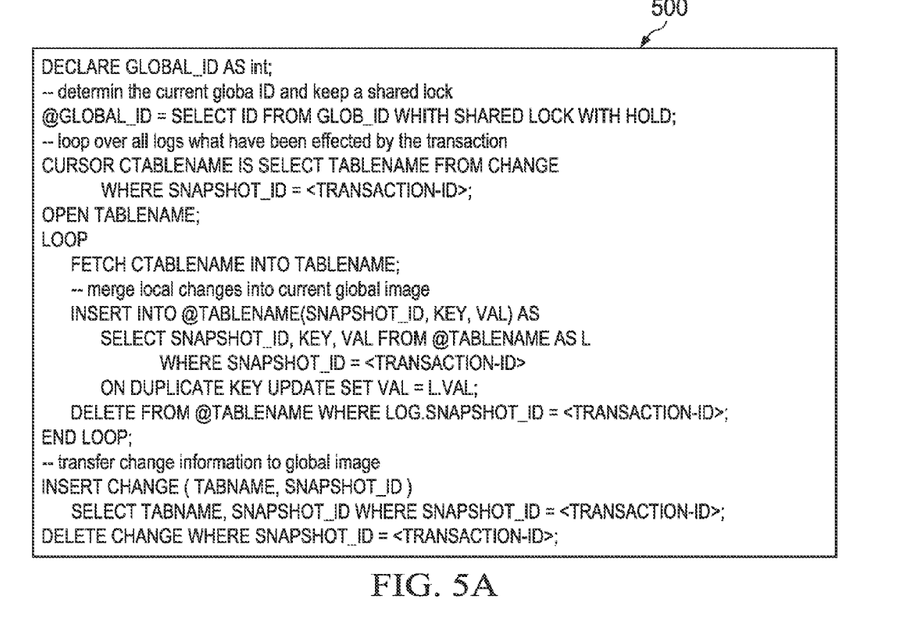
FIGS. 5A-5B illustrate example instructions executed by a system including a replication module for replicating data from a source database to a target database according to the present disclosure.

In such example alternative embodiments, code included and/or executed by the replication module may be different than that described above with reference to FIGS. 3A-3B. For example, code 500 shown in FIG. 5A may be executed by and/or in the replication module in order to, for instance, implement and/or increment the GLOBAL IMAGE ID. In some instances, such code may be simpler since a determination of the maximum COMMIT ID is no longer necessary.

Figure 3B:
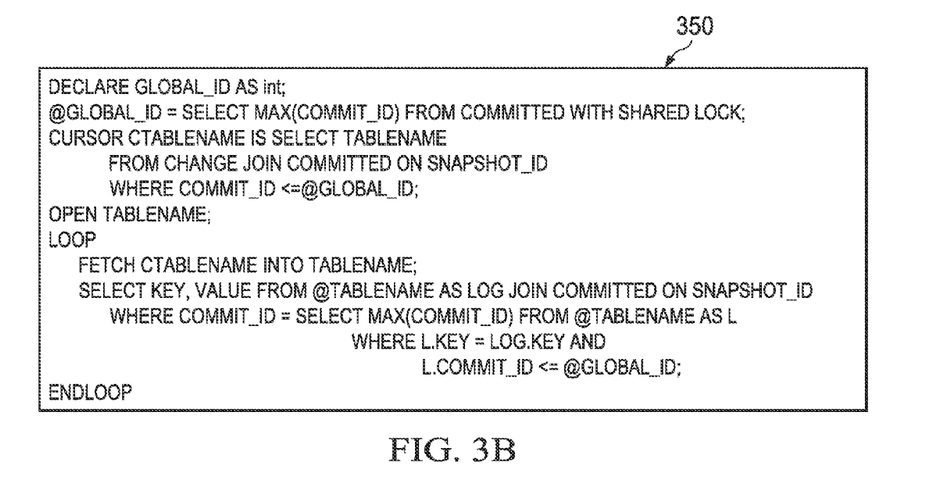
Figure 5B:
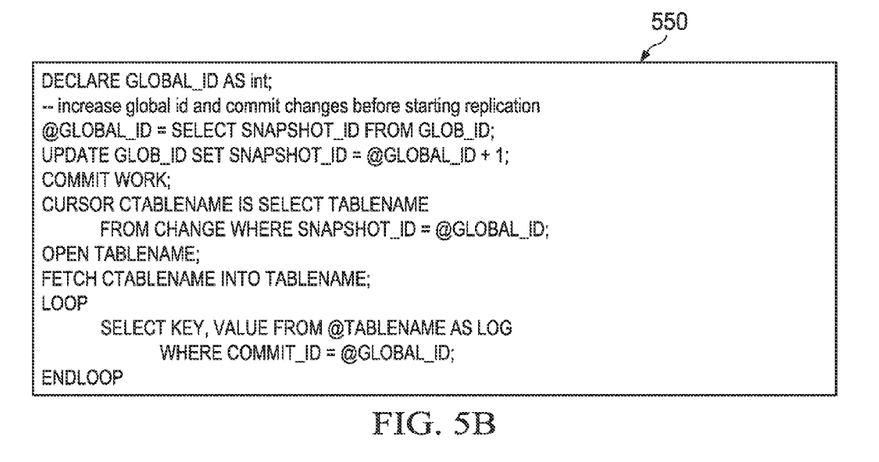

Further, in such example embodiments, code to initiate replication may be different than that shown in FIG. 3B. For example, code 550 in FIG. 5B may illustrate example code included in and/or executed by the replication module for replication.

Continuing the above alternative example, it may be assumed that transaction T100 already committed successfully. As a result, its changes are captured in an image 1 while T200 and T300 still have private images. The replication module may acquire an exclusive lock on the GLOBAL ID table 635 shown in FIG. 6C in order to increase the GLOBAL IMAGE ID. Since T200 holds a shared lock while merging its changes into the image 1, the replication module may wait until T200 commits. Transaction T300 may be prevented from committing its changes unless the replication module has increased the GLOBAL IMAGE ID to 2.

Once the GLOBAL IMAGE ID is increased to 2, then T300 may merge its changes into an image 2. Until then, however, the replication module can select all entries of image 1. This alternative embodiment may be advantageous if there are many update statements in the application. If replication is not frequent, then the log tables produced are smaller than in the first approach described with reference to method 200. For example, maximum size is limited by twice the size of the original table. However, transactions in the source database may slow down, since they have to compress the log tables while committing. The replication module, however, may not sort out multiple updates on a certain key.

A number of implementations have been described. Nevertheless, it will be understood that various modifications can be made. For example, other methods described herein besides those, or in addition to those, illustrated in FIG. 2 can be performed. Further, the illustrated steps of method 200 can be performed in different orders, either concurrently or serially. Further, steps can be performed in addition to those illustrated in method 200, and some steps illustrated in method 200 can be omitted without deviating from the present disclosure. Further, although not illustrated, one or more of the tables shown in FIGS. 4A-4C and 6A-6F may be stored on one or both of the source database 145 or the target database 150, or at a respective server or client system communicably coupled thereto. Accordingly, other implementations are within the scope of the following claims.

What is claimed is:

1. A method performed with a computing system for replicating data to a database, the method comprising:
   determining a change to at least one database value in a database table of a database on a source repository;
   updating, based on the change to the at least one database value, a snapshot value associated with the change to the at least one database value stored in a log table, the log table comprising the database value, a database key associated with the database value, and the snapshot value associated with the change to the at least one database value;
   updating, based on the updated snapshot value, a change table comprising a plurality of snapshot values and a plurality of database table names, each of the plurality of snapshot values associated with a corresponding database table name;
   incrementing, based on the update to the snapshot value, a commit value associated with the snapshot value stored in a commit table, the commit table comprising a plurality of commit values associated with a plurality of corresponding snapshot values;
   generating the commit table comprising the plurality of commit values associated with the plurality of corresponding snapshot values, wherein the commit table is associated with a plurality of log tables;
   initiating replication of the database from the source repository to a target repository;
   determining, subsequent to initiating replication, a maximum commit value of the plurality of commit values; and
   replicating the database value in the database table from the source repository to the target repository based on the commit value associated with the snapshot value being less than or equal to the maximum commit value.

2. The method of claim 1, further comprising:
   acquiring a lock on the database table during replication of the database value in the database table from the source repository to a target repository; and
   substantially preventing changes to the at least one database value in the database table during lock.

3. The method of claim 1, further comprising:
   applying the replicated database value in the database table in the target repository to a corresponding database value in a corresponding database table in the target repository so that the corresponding database value matches the replicated database value.

4. The method of claim 3, further comprising:
   determining a change to a second database value in the database table;
   updating, based on the change to the second database value, a second snapshot value associated with the change to the second database value stored in the log table;
   incrementing, based on the update to the second snapshot value, a second commit value associated with the second snapshot value stored in the commit table; and
   replicating the second database value from the source repository to the target repository based on the second commit value associated with the second snapshot value being less than or equal to the maximum commit value.

5. The method of claim 4, wherein replicating the second database value in the database table from the source repository to the target repository occurs substantially in parallel with applying the replicated database value in the database table in the target repository to the corresponding database value in a corresponding database table in the target repository.

6. The method of claim 1, wherein replicating the database value in the database table from the source repository to the target repository comprises replicating the database value in the database table from the source repository to the target repository at a read uncommitted transaction isolation level.

7. The method of claim 1, further comprising:
generating the log table comprising the database value, the database key associated with the database value, and the snapshot value associated with the change to the at least one database value, the log table further comprising an operation value associated with the change to the at least one database value.

8. The method of claim 1, wherein updating a change table comprises increasing a snapshot value of the plurality of snapshot values.

9. An apparatus comprising instructions embodied on a tangible, non-transitory computer-readable storage media, the instructions operable when executed to cause a computing system to perform operations comprising:
determining a change to at least one database value in a database table of a database on a source repository;
updating, based on the change to the at least one database value, a snapshot value associated with the change to the at least one database value stored in a log table, the log table comprising the database value, a database key associated with the database value, and the snapshot value associated with the change to the at least one database value;
updating, based on the updated snapshot value, a change table comprising a plurality of snapshot values and a plurality of database table names, each of the plurality of snapshot values associated with a corresponding database table name;
incrementing, based on the update to the snapshot value, a commit value associated with the snapshot value stored in a commit table, the commit table comprising a plurality of commit values associated with a plurality of corresponding snapshot values;
generating the commit table comprising the plurality of commit values associated with the plurality of corresponding snapshot values, wherein the commit table is associated with a plurality of log tables;
initiating replication of the database from the source repository to a target repository;
determining, subsequent to initiating replication, a maximum commit value of the plurality of commit values; and
replicating the database value in the database table from the source repository to the target repository based on the commit value associated with the snapshot value being less than or equal to the maximum commit value.

10. The apparatus of claim 9, wherein the operations further comprise:
acquiring a lock on the database table during replication of the database value in the database table from the source repository to a target repository; and
substantially preventing changes to the at least one database value in the database table during lock.

11. The apparatus of claim 9, wherein the operations further comprise:
applying the replicated database value in the database table in the target repository to a corresponding database value in a corresponding database table in the target repository so that the corresponding database value matches the replicated database value.

12. The apparatus of claim 11, wherein the operations further comprise:
determining a change to a second database value in the database table;
updating, based on the change to the second database value, a second snapshot value associated with the change to the second database value stored in the log table;
incrementing, based on the update to the second snapshot value, a second commit value associated with the second snapshot value stored in the commit table; and
replicating the second database value from the source repository to the target repository based on the second commit value associated with the second snapshot value being less than or equal to the maximum commit value.

13. The apparatus of claim 12, wherein replicating the second database value in the database table from the source repository to the target repository occurs substantially in parallel with applying the replicated database value in the database table in the target repository to the corresponding database value in a corresponding database table in the target repository.

14. The apparatus of claim 9, wherein replicating the database value in the database table from the source repository to the target repository comprises replicating the database value in the database table from the source repository to the target repository at a read uncommitted transaction isolation level.

15. The apparatus of claim 9, wherein the operations further comprise:
generating the log table comprising the database value, the database key associated with the database value, and the snapshot value associated with the change to the at least one database value, the log table further comprising an operation value associated with the change to the at least one database value.

16. The apparatus of claim 9, wherein updating a change table comprises increasing a snapshot value of the plurality of snapshot values.

17. A computing system, comprising a memory, one or more processors, and instructions stored on the memory and operable when executed by the one or more processors to cause the computing system to perform operations comprising:
determining a change to at least one database value in a database table of a database on a source repository;
updating, based on the change to the at least one database value, a snapshot value associated with the change to the at least one database value stored in a log table, the log table comprising the database value, a database key associated with the database value, and the snapshot value associated with the change to the at least one database value;
updating, based on the updated snapshot value, a change table comprising a plurality of snapshot values and a plurality of database table names, each of the plurality of snapshot values associated with a corresponding database table name;
incrementing, based on the update to the snapshot value, a commit value associated with the snapshot value stored in a commit table, the commit table comprising a plurality of commit values associated with a plurality of corresponding snapshot values;
generating the commit table comprising the plurality of commit values associated with the plurality of corresponding snapshot values, wherein the commit table is associated with a plurality of log tables;
initiating replication of the database from the source repository to a target repository;
determining, subsequent to initiating replication, a maximum commit value of the plurality of commit values; and replicating the database value in the database table from the source repository to the target repository based on the commit value associated with the snapshot value being less than or equal to the maximum commit value.

18. The system of claim 17, wherein the operations further comprise:
  acquiring a lock on the database table during replication of the database value in the database table from the source repository to a target repository; and
  substantially preventing changes to the at least one database value in the database table during lock.

19. The system of claim 17, wherein the operations further comprise:
  applying the replicated database value in the database table in the target repository to a corresponding database value in a corresponding database table in the target repository so that the corresponding database value matches the replicated database value.

20. The system of claim 19, wherein the operations further comprise:
  determining a change to a second database value in the database table;
  updating, based on the change to the second database value, a second snapshot value associated with the change to the second database value stored in the log table;
  incrementing, based on the update to the second snapshot value, a second commit value associated with the second snapshot value stored in the commit table; and
  replicating the second database value from the source repository to the target repository based on the second commit value associated with the second snapshot value being less than or equal to the maximum commit value.

21. The system of claim 20, wherein replicating the second database value in the database table from the source repository to the target repository occurs substantially in parallel with applying the replicated database value in the database table in the target repository to the corresponding database value in a corresponding database table in the target repository.

22. The system of claim 17, wherein replicating the database value in the database table from the source repository to the target repository comprises replicating the database value in the database table from the source repository to the target repository at a read uncommitted transaction isolation level.

23. The system of claim 17, wherein the operations further comprise:
  generating the log table comprising the database value, the database key associated with the database value, and the snapshot value associated with the change to the at least one database value, the log table further comprising an operation value associated with the change to the at least one database value.

24. The system of claim 17, wherein updating a change table comprises increasing a snapshot value of the plurality of snapshot values.

* * * * *